United States Patent Office 3,343,095
Patented Sept. 19, 1967

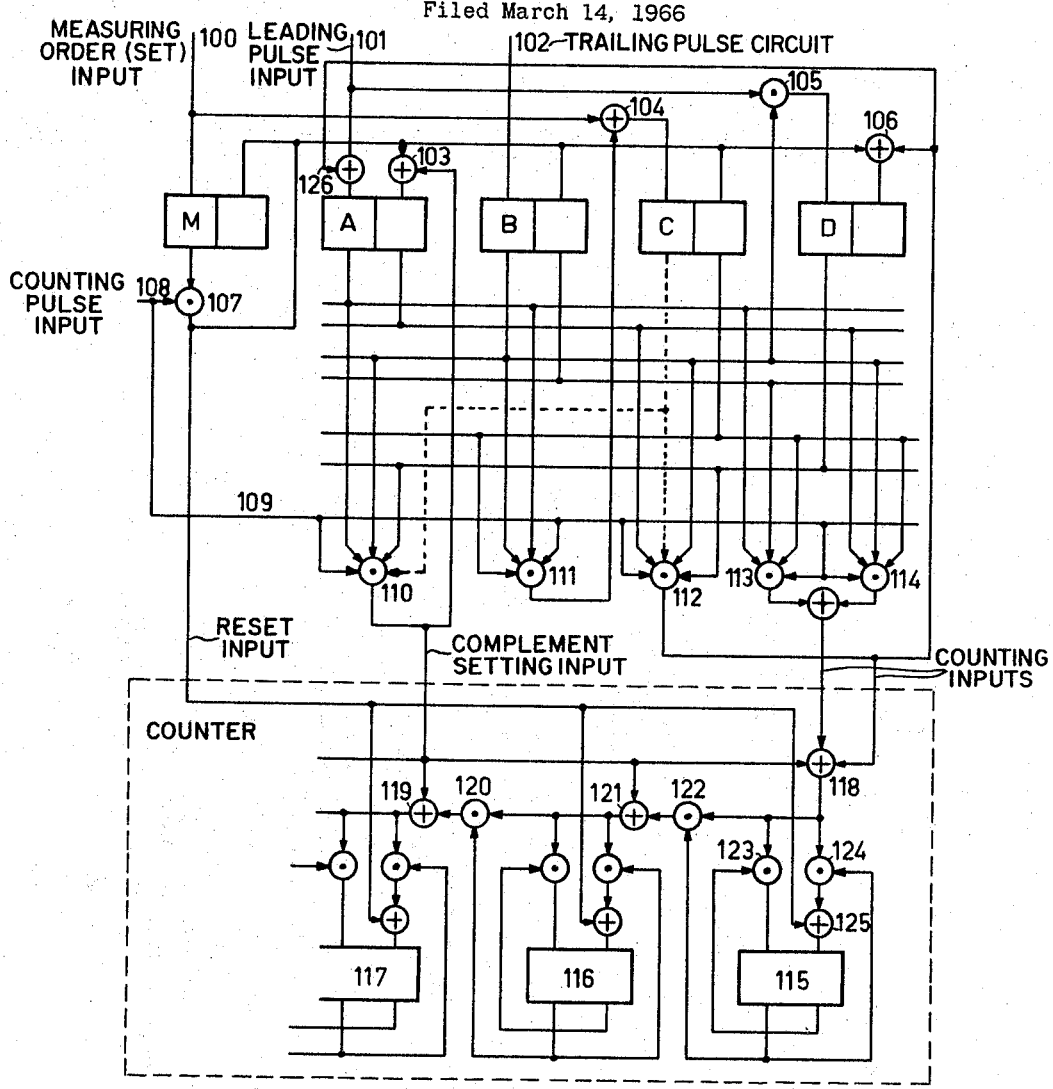

3,343,095
ARRANGEMENT FOR DIGITALLY ESTABLISHING A MEASURED VALUE REPRESENTED BY AN INTERVAL SITUATED BETWEEN TWO SUCCESSIVE ELECTRICAL PHENOMENA
Rienk Pieter Offereins, Hengelo Overijsel, Netherlands, assignor to N.V. Hollandse Signaalapparaten Hengelo (Overijsel), Netherlands, a firm of the Netherlands
Filed Mar. 14, 1966, Ser. No. 534,020
Claims priority, application Netherlands, Mar. 16, 1965, 65—3,287
5 Claims. (Cl. 328—48)

ABSTRACT OF THE DISCLOSURE

A system is disclosed for measuring the number of clock pulses which occur between the occurrence of the pulses of a pair of input pulses; wherein the input pulses occur in a continuous sequence of pulse pairs and wherein the sum of the times between any input pulse and the next preceding and next succeeding pulses is constant. The system has means for intiating a measuring interval, and a counter which starts on receiving the first input pulse occurring during the measuring interval and stops on receiving the second input pulse occurring during the measuring interval. Since the first received input pulse during the measuring interval may be the second pulse of a pair of pulses, the system includes means responsive to such a condition for setting the counter to its complement and adding another pulse thereto.

This invention relates to an arrangement for digitally establishing a measured value represented by an interval situated between two successive electrical phenomena that occur in pairs in such a way that the sum of the intervals between such a phenomenon and the two phenomena occurring directly on either side of this phenomenon has a constant value that is independent of the measured value as long as this measured value does not change; the measured value being established by counting pulses which are received from a pulse source with a frequency that is constant with respect to the recurrence frequency of the phenomenae, in an electronic counter during such an interval.

In arrangements of the type defined above belonging to the prior art, the electrical phenomenae are, as a rule, either pulses or predetermined edges of square-wave voltages, or the two edges of the same square-wave voltage.

In a certain arrangement of this type belonging to the prior art, the measured value is the position of a movable object. The movable part of a synchronous transformer moves in accordance with said object. The polyphase winding of the transformer is fed by a polyphase voltage, and one of the phenomena is a recurrent pulse derived from the monophase output voltage of the transformer. The other phenomenon is generated in a similar way by means of a fixedly adjusted second synchronous transformer. In another arrangement of this type belonging to the prior art, pairs of pulses are derived from the output voltage of the polyphase windings of a single phase fed synchronous transformer with a movable part that moves in accordance with a movable object, the position of which constitutes the measured value. The moments of occurrence of these two pulses vary in opposite direction as a function of the position of the movable part of the synchronous transformer. However, the invention can also be applied in telemetering systems operating according to the pulse interval or the pulse duration method, in which systems the interval between two successive pulses of a recurrent pair of pulses or the duration of a recurrent square-wave voltage or pulse represents the measured value; it can also be applied in pulse echo range measuring systems.

In known arrangements a measuring operation is, as a rule, initiated by a measuring order. This order is a pulse or a voltage, and prepares the start of the counting operation that establishes the duration of the interval. In the known arrangements a predetermined one of the two phenomena constituting the limits of the interval then starts the counting, for instance the pulse the moment of occurrence of which is determined by the measured value. The moment of occurrence of the measuring order is arbitrarily situated with respect to the moments of occurrence of the two phenomena. It could be that the measuring order is received accidentally immediately after the reception of the phenomenon that is to start the counting. Should this be the case the arrangement will have to wait for nearly the duration of a complete measuring cycle after it has received a measuring order before the counting can begin. The time-loss resulting therefrom decreases the efficiency of the arrangement. If no such time-losses should occur, a higher recurrence frequency of the measurement, and consequently a better image of a changing value, might be obtained, whilst an arrangement operating with electronic distributors in order successively to supply a number of measured values would become able to deal with a larger number of such values.

It is the object of the present invention to reduce substantially the time losses mentioned above. For this purpose an arrangement according to the invention is built in such a way that the counting operation is started by the first electrical phenomenon following on the measuring order, irrespective of which of the two successive phenomena constituting the two limits of the interval it is, whilst the counter effecting the counting supplies the value stored by it after the counting has been completed if a predetermined one of the two phenomena has started the counting, but supplies the complement of this value if the other one of the two phenomena has started the counting.

In this way a time-saving of on the average nearly half the duration of the measuring cycle (interval between corresponding phenomena of two successive pairs of phenomena) can be obtained.

In preferred embodiments of arrangements according to the invention, using a binary counter, in order to obtain the complement of the value stored in the counter firstly all trigger circuits in the counter are switched over and secondly a counting pulse is supplied to the counter.

With reference to the figure an embodiment of an arrangement according to the invention will now be described. This arrangement measures the time interval between two pulses that are respectively supplied to the conductor 101 and the conductor 102. One of these pulses could be a pulse supplied by a well-known arrangement in which it is derived by an auxiliary network from the output voltage of a synchronous transformer with a movable part that is driven by the object, the position of which is to be established, whilst the other pulse is derived in a similar way from the output voltage of a fixedly adjusted synchronous transformer and constitutes a reference pulse. The invention can, however, be applied independently of the way in which these pulses are generated, provided that the time interval between these pulses is determined by a measured value, and that, moreover, the sum of the intervals between such a pulse and the pulses on either side of this pulse is constant and independent of the measured value as long as this value does not change. A measuring operation is initiated by a measuring order consisting of a short pulse applied o circuit 100. This pulse sets the trigger circuit M by way of a direct connection, and the trigger circuit C by way of "or" circuit 104. The trigger circuit M applies in its set condition a high potential to the upper input circuit of "and" circuit 107. Counting pulses are continually applied by way of circuit 108 to the left input circuit of this "and" circuit. Consequently the first pulse following on the setting of trigger circuit M will be able to pass "and" circuit 107. This pulse simultaneously resets the trigger circuits M, A, B, C and D, insofar as these circuits are set at that moment. The resetting of the trigger circuit M restricts the number of counting pulses that can pass the "and" circuit 107 to one. Moreover, the pulse that has passed the "and" circuit 107 is supplied as a zero setting pulse to all trigger circuits in the counter that establishes the duration of the interval between the measuring pulses supplied to the circuits 101 and 102 by counting the counting pulses supplied by the counting pulse supply circuit 108 during this interval. The zero setting pulse reaches the right control circuit of the counter trigger circuit 115 by way of an "or" circuit 125 inserted in this control circuit and the right control circuits of the other trigger circuits by way of corresponding "or" circuits. In this way all counter trigger circuits are reset. The trigger circuit C is set by the measuring order pulse by way of "or" circuit 104 in order to prevent counting pulses from reaching the counter while it is being reset to zero; it will be shown below that these counting pulses can only reach the counter as long as trigger circuit C is reset. The switching operations described above having been effected, the arrangement is ready for establishing the duration of a pulse interval. It now waits for the first pulse to reach one of the circuits 101 or 102. Assume that the measuring order has been received at such a moment that the first pulse following on this order is supplied by way of circuit 101. This pulse sets trigger circuit A. Because trigger circuit A is now set and trigger circuits B and C are now reset, the counting pulses supplied by way of circuit 108, 109 can reach the counter by way of "and" circuit 113. The counter is a pulse counter of a well-known type and need not be described in detail. Each trigger circuit of the counter is provided with two control circuits, in each of which an "and" circuit (123 and 124 in the case of trigger circuit 115) with two input circuits is inserted. One input circuit of each of the two "and" circuits belonging to the same trigger circuit are connected to a common pulse supply circuit for this trigger circuit; the remaining input circuits of these "and" circuits are connected cross-wise to the output circuits of the same trigger circuit. Consequently a pulse supplied to the common pulse supply circuit sets the trigger circuit if it is in the reset state, and resets it if the trigger circuit is in the set state. The pulses are of very short duration, so that a pulse is already finished before the switch-over of the trigger circuit initiated by it is completed and the "and" circuit that was blocked receives a voltage from this trigger circuit permitting it to let a pulse pass. Consequently a pulse cannot initiate a second switch-over; the trigger circuit will have to wait for the next counting pulse in order to be switched-over again. In its set state the trigger circuit 115 applies a voltage to the "and" circuit 122 that permits this "and" circuit to let a pulse applied to the common pulse supply circuit of trigger circuit 115 pass to the common pulse supply circuit of the trigger circuit 116. Because the trigger circuit 115 requires some time to be switched-over, the short pulse that initiated its setting will not be able to pass "and" circuit 122; only the pulses that resets trigger circuit 115 will pass "and" circuit 122 and cause a switch-over of the next trigger circuit 116. A similar cooperation exists between each trigger circuit and an "and" circuit through which the next trigger circuit receives pulses from the previous one; e.g. between trigger circuit 116 and "and" circuit 120. In this way each trigger circuit in the counter receives half as many pulses as the previous trigger circuit. After an interval determined by the measured value has elapsed, the other pulse defining the interval is received by way of circuit 102. This pulse sets trigger circuit B. Trigger circuits A and B being now set, neither "and" circuit 113 nor "and" circuit 114 is able to supply pulses to the counter, that consequently stops. In order definitely to interrupt the supply of pulses to the counter until a next measuring order has been received, as soon as both trigger circuit A and trigger circuit B are set, a pulse is supplied to the left control circuit of trigger circuit C by way of "and" circuit 111 and "or" circuit 104, causing the setting of trigger circuit C. Preferably the passage of pulses through "and" crcuit 11 is made to depend on trigger circuit C being in its reset state by means of an input circuit of the "and" circuit 11. This restricts the number of pulses supplied to trigger circuit C to one. The trigger circuit C being set, the "and" circuit 113 and 114 are definitely blocked for counting pulses. The counter now registers the digital value that corresponds to the interval between the pulses supplied to the circuits 101 and 102, and apart from the transfer of this value to some data handling system in a way that is not related to the invention and, therefore, will not be described, nothing happens in the arrangement until a measuring order is once more received.

It may also be that the measuring order is received at such a moment that the first pulse following on this order is received by way of circuit 102, and is consequently the last of the two pulses defining the pulse interval. When it is received, this pulse sets trigger circuit B and causes the supply of counting pulses by way of "and" circuit 114 that is conductive for these pulses, because, simultaneously, trigger circuits A and C are reset and trigger circuit B is set. Consequently, also the pulse supplied to circuit 102 initiates the digital determination of the pulse interval.

Next, a pulse is received by way of circuit 101. This is the pulse marking the beginning of the pulse interval following the interval that ended with the reception of the pulse that has set trigger circuit B. The pulse received by way of circuit 101 sets trigger circuit A. Trigger circuits A and B being now simultaneously in the set condition, counting pulses can no longer reach the counter, that consequently stops. Furthermore, in the way described above a pulse supplied by way of "and" circuit 111 sets trigger circuit C for the reasons already elucidated. Because in this case trigger circuit B is set at the moment the pulse that sets A is received, this pulse can also pass "and" circuit 105 and set trigger circuit D. The fact that trigger circuit D is set shows that, instead of the duration of the interval determined by the measured value, the duration of the remaining part of the complete cycle of the arrangement has been established by the counter. A correct operation of an arrangement digitalising a value by counting pulses during an interval representing this value can only be obtained if there is a fixed relation between the frequency of the counting pulses and the recurrence frequency of the measuring cycles, the latter frequency being, for instance, derived from the recurrence frequency of that pulse limiting the measuring interval the moment of occurrence of which does not depend on the measured value. In this case a predetermined number of counting pulses will be received during a complete measuring cycle, and only in this case will a certain interval, corresponding to a certain value of the measured value, always result in the same number of pulses being supplied to the counter and in the same setting of the counter. This fixed relation can be established in various ways, for instance by deriving the counting pulses as well as the alternating voltage controlling the supply to the synchronous transformers in a system using such transformers, by means of frequency division from the same source of alternating voltage or pulses.

Assume now that the counter is adapted in such a way to the predetermined number of counting pulses corresponding to a complete measuring cycle defined above, that this number of pulses causes also the counter to effect a complete cycle, running for instance from zero setting to zero setting. In this case the setting of the counter reached when it has been started by the pulse that defines the end of the interval representing the measured value is the complement with respect to a complete cycle of the counter of the setting that would have been obtained if the operation of the counter had been started by the pulse defining the beginning of the interval.

If the counter, has a complete cycle which corresponds to a complete measuring cycle as described above, and registers the complement of the value to be established, owing to the fact that the counting was started by the pulse representing the end of the measuring interval, in the embodiment described, the true value is obtained by switching-over all trigger circuits in the counter, and after that, supplying one pulse to the counter, in connection with the fact that the value stored by the counter after the switch-over is one unit lower than the complement. The switch-over of all counter trigger circuits is effected by a pulse supplied by "and" circuit 110 when trigger circuits A, B and D have all reached the set state. Preferably the supply of this pulse is also made to depend on the set state of trigger circuit C by means of a fifth input circuit of "and" circuit 110; this rigidly ensures the correct sequence of operation. The said pulse reaches the common pulse supply circuit of each counter trigger circuit by way of "or" circuits 118, 121, 119 and switches all these trigger circuits over. Moreover, this pulse resets trigger circuit A by way of "or" circuit 103, so that a second pulse will not pass "and" circuit 110, and the counter trigger circuits are switched-over only once. The trigger circuit A being reset and the trigger circuit D set, the next counting pulse supplied by conductor 109 can pass "and" circuit 112 and reach the counter pulse supply circuit through "or" circuit 118, so that the counter takes one step forwards, after which the counter stores the same value it would have stored if the counting had been started by the pulse that marks the beginning of the measuring interval and is supplied through the circuit 101. Through "or" circuit 106 the same pulse reaches the right control circuit of trigger circuit D and resets it. Through "or" circuit 126 it also reaches the left control circuit of trigger circuit A and sets it. Preferably the pulse supplied through "and" circuit 112 is also made to depend on trigger circuit C being set, in order to ensure the correct sequence of operations. The trigger circuits A, B and C are now set and the trigger circuit D reset, so that no further pulses can reach the counter or the trigger circuits, and the arrangement has reached the condition it also had after a counting operation initiated by a pulse received by way of circuit 101, so that nothing will happen until a measuring order is again received.

In an arrangement with a binary counter it would be possible to obtain the complement of the stored value by reading the other output circuits of the counter trigger circuits and adding a unit to the value thus obtained by means of an adding network connected to said output circuits. Such an adding network can also be used to add a unit to the value supplied by the counter after all its trigger circuits have been switched-over. As a rule, these methods will only be used in arrangements in which the relatively complicated adding network cannot be dispensed with for other reasons.

The application of the invention is not restricted to arrangements with binary counters. For instance, it can be successfully applied in an arrangement with a decimal counter, especially if this counter operates with the excess-three code because the second set of output circuits of the trigger circuits of such a counter directly supplies the 9-complement of the value stored by the counter. Also this complement is one unit too low, so that an adding network must be used to add this unit to the value supplied by the counter.

It is to be noted that the figure shows the arrangement in simplified form, insofar as details are concerned that are not essential for the invention and are well-known in the art. A few of these details will now be considered.

When an "and" circuit that operates as switching means in a pulse circuit is controlled by voltages the supply of which is synchronized with the pulses, for instance because they are supplied by trigger circuits that are controlled by pulses from the source feeding the pulse circuit, it is always possible to select electric values and delay times in such a way that the "and" circuit will never suppress a part of a pulse and will only let complete pulses pass. If, however, the supply of at least one of the voltages controlling the "and" circuit is not synchronized with the pulse supply but may be received at arbitrary moments, as is the case with the control voltages supplied by the trigger circuits M, A and B controlled by the measuring order pulse applied to circuit 100, and the pulses applied to the circuits 101 and 102, the moment at which such a control voltage becomes effective may be such, that a pulse is mutilated. If such a mutilated pulse is used to control a plurality of trigger circuits the result may be that only a part of these trigger circuits react, and in this case the circuit does not operate correctly. There is a standard solution for this problem consisting in the insertion of pulse regeneration circuits in the output circuits of "and" circuit controlled by non-synchronized voltages. Such a regenerator comprises a one-shot pulse generator, such as a blocking oscillator, the operation of which is initiated by each pulse passing through the "and" circuit. If this pulse is unmutilated or slightly mutilated, the one-shot generator supplies a complete pulse, but if the pulse is too seriously mutilated the one-shot generator does not operate at all. The circuit then waits for the next pulse, so that the only effect of the mutilation is a delay of one pulse, which in many circuits does not influence the measuring result, but only causes a slight lengthening of the duration of the operation, and, in the circuits supplying the counting pulses to the counter, may cause an error equivalent to one pulse. Such regenerators are standard practice in data-handling systems. They are considered to be included, where necessary, in the "and" circuits.

Moreover, it is standard practice to divide "and" circuits that are inserted in pulse circuits into two separate "and" circuits, a first "and" circuit having only two input circuits, one input circuit receiving the pulses (as a rule through a condenser), and another input circuit connected to the output circuit of an "and" circuit controlled by the non-pulse voltages that are to control the passage of the pulses. For simplicity's sake these combinations of "and" circuits have been shown as a single "and" circuit.

What I claim is:

1. A system for digitally measuring the interval of time between first and second successive phenomena occurring on electric signals, wherein said phenomena occur in recurrent pairs of first and second phenomena and the sum of the intervals between each phenomenon and the next succeeding and next preceding phenomenon is substantially constant, comprising a source of said electric signals, a source of recurrent counting pulses, a source of a measuring order signal, counting means having a counting pulse input and a zero setting input, a control circuit for applying said counting pulses to said counting means, and means applying said electric signals, counting pulses and measuring order signal to said control circuit, said control circuit having a first output connected to said counting pulse input, a second output connected to said zero setting input, and a third output connected to said counting means, said control circuit comprising means responsive to said measuring order signal for applying a pulse to said second output, whereby said counting means is reset, means responsive to the first received of said first and second phenomena following said measuring order signal for enabling the continuous application of said counting pulses to said first output, means responsive to the second received of said first and second phenomena following said measuring order signal for inhibiting further application of said counting pulses to said first output, and means responsive to the reception of said second phenomenon before said first phenomenon following said measuring order signal for applying a pulse to said third output, said counting means further comprising means responsive to the occurrence of a pulse at said third output for resetting said counting means to the complement of the pulse count received at said counting pulse input, whereby the count of said counting means is independent of the order of occurrence of said first and second phenomena following a measuring order signal.

2. The system of claim 1 wherein said control circuit comprises first and second AND gates, means for applying the outputs of said first and second AND gates to said first output, means for applying said counting pulses to said first and second AND gates, means responsive to the occurrence of said first phenomenon only before the occurrence of said second phenomenon following a measuring order signal for opening said first AND gate, means responsive to the occurrence of said second phenomenon only before the occurence of said first phenomenon following a measuring order signal for opening said second AND gate, third and fourth AND gates, means applying said counting pulses to said third and fourth AND gates, means applying the output of said third AND gate to said second output, means responsive to said measuring order signal for opening said third AND gate to pass a single counting pulse to said second output, means connecting the output of said fourth AND gate to said third output, and means responsive to the occurrence of said second phenomenon following said measuring order signal before said first phenomenon for passing a single counting pulse to said third output.

3. The system of claim 2 in which said first phenomenon is a series of pulses on a first signal and said second phenomenon is a series of pulses on a second signal, wherein said control circuit comprises first, second and third bistable circuits each having first and second states, means responsive to said measuring order signal to set said first, second and third bistable circuits to said first state, means responsive to pulses on said first and second signals for setting said first and second bistable circuits respectively to said second state, a fifth AND gate responsive to the occurrence of a pulse of said first signal when said second bistable circuit is in its second state for setting said third bistable circuit to its second state, said means for opening said first AND gate comprising means resonsive to the second state of said first bistable circuit and the first state of said second bistable circuit for opening said first AND gate, said means for opening said second AND gate comprises means responsive to the first state of said first bistable circuit and the second state of said second bistable circuit, said means for opening said fourth AND gate comprises means responsive to the second states of said first, second and third bistable circuits for opening said fourth AND gate, and means responsive to an output pulse from said fourth AND gate for setting said first bistable circuit to its first state.

4. The system of claim 3 comprising a fourth bistable circuit, comprising means responsive to said pulse at said second terminal for setting said fourth bistable circuit to its first state, a sixth AND gate, means responsive to said second states of said first and second bistable circuits and the first state of said fourth bistable circuit for opening said sixth AND gate to pass a counting pulse, means for applying the counting pulse output of said sixth AND gate to said fourth bistable circuit for setting it to its second state, and means connecting said fourth bistable circuit to said first, second and fourth AND gates to inhibit opening of said first and second AND gates when said fourth bistable circuit is in its second state and to inhibit opening of said fourth AND gate when said fourth bistable circuit is in its first state.

5. The system of claim 3 comprising a seventh AND gate responsive to the first state of said first bistable circuit and the second states of said second and third bistable circuits for applying a counting pulse to the counting pulse input of said counting means, and means responsive to an output pulse from said seventh AND gate for setting said third bistable circuit to its first state and said first AND gate to its second state, whereby a single counting pulse is added to the count of said counting means following the occurrence of a pulse at the third output of said control circuit.

References Cited
UNITED STATES PATENTS

| | | | |
|---|---|---|---|
| 2,493,627 | 1/1950 | Grosdoff | 328—48 X |
| 2,519,184 | 8/1950 | Grosdoff | 328—48 |
| 3,137,818 | 6/1964 | Clapper | 328—48 X |

ARTHUR GAUSS, *Primary Examiner.*

JOHN S. HEYMAN, *Examiner.*

UNITED STATES PATENT OFFICE
CERTIFICATE OF CORRECTION

Patent No. 3,343,095                                          September 19, 1967

Rienk Pieter Offereins

It is hereby certified that error appears in the above numbered patent requiring correction and that the said Letters Patent should read as corrected below.

Column 4, line 12, for "crcuit 11" read -- circuit 111 --; line 14, for "11" read -- 111 --; column 8, line 1, for "resonsive" read -- responsive --.

Signed and sealed this 21st day of January 1969.

(SEAL)
Attest:

Edward M. Fletcher, Jr.                                      EDWARD J. BRENNER
Attesting Officer                                                  Commissioner of Patents